United States Patent
Sarasua Maritxalar et al.

(10) Patent No.: US 12,103,063 B2
(45) Date of Patent: Oct. 1, 2024

(54) APPARATUS FOR CENTERING AND LOADING FLAT FORMAT PARTS IN A PRESS

(71) Applicant: FAGOR ARRASATE, S.COOP., Arrasate (ES)

(72) Inventors: Oier Sarasua Maritxalar, Mondragon (ES); Andoitz Aranburu Irastorza, Antzuola (ES)

(73) Assignee: FAGOR ARRASATE, S.COOP., Arrasate (ES)

( * ) Notice: Subject to any disclaimer, the term of this patent is extended or adjusted under 35 U.S.C. 154(b) by 0 days.

(21) Appl. No.: 18/329,698

(22) Filed: Jun. 6, 2023

(65) Prior Publication Data

US 2023/0364666 A1    Nov. 16, 2023

Related U.S. Application Data

(63) Continuation of application No. PCT/EP2023/061874, filed on May 4, 2023.

(30) Foreign Application Priority Data

May 10, 2022  (EP) .................................... 22382451
May 10, 2022  (ES) ........................... ES202230783U
Oct. 7, 2022   (EP) .................................... 22382947

(51) Int. Cl.
  *B21D 43/00*   (2006.01)
  *B23Q 7/18*    (2006.01)

(52) U.S. Cl.
  CPC ............. *B21D 43/003* (2013.01); *B23Q 7/18* (2013.01); *B23Q 2240/002* (2013.01)

(58) Field of Classification Search
  CPC ...... B21D 43/10; B21D 43/105; B21D 43/11; B25J 19/023; B25J 9/1697; B65G 61/00; B65G 47/91; B65G 47/907; B65G 59/00
  See application file for complete search history.

(56) References Cited

U.S. PATENT DOCUMENTS 4,435,837 A * 3/1984 Abernathy ........... G06V 10/435
                                                            901/2
5,040,056 A    8/1991 Sager et al.
(Continued)

FOREIGN PATENT DOCUMENTS

DE    102017121557 A1     3/2019
DE    102020108037 A1 *   9/2021
(Continued)

OTHER PUBLICATIONS

European Search Report, Application No. 22382451.7, Jan. 31, 2023, 11 pages.

*Primary Examiner* — Gregory W Adams
(74) *Attorney, Agent, or Firm* — Edell, Shapiro & Finnan, LLC

(57) ABSTRACT

Apparatus and methods for loading parts in a press wherein a conveyor transports the parts in a forward movement direction towards the press. An optical measuring device determines the real position of the parts on the conveyor. At least two transfer devices are configured to grab the parts off the conveyor and place them directly on a first surface of the press. A control unit is configured to receive the real position of the parts determined by the optical measuring device, and to compare the real position with a theoretical loading position of the parts on the first surface of the press. The control unit determines a deviation between the real and theoretical loading positions and uses the calculated deviation to command the transfer devices to correct the deviation and to place the parts on the first surface of the press in the theoretical position.

18 Claims, 10 Drawing Sheets

(56) References Cited

U.S. PATENT DOCUMENTS

| | | | | |
|---|---|---|---|---|
| 6,817,829 | B2* | 11/2004 | Kameda | B65G 61/00 414/789.6 |
| 8,790,064 | B2* | 7/2014 | Dorner | B21D 43/003 901/7 |
| 8,920,108 | B2* | 12/2014 | Naumann | B21D 43/105 414/751.1 |
| 8,931,999 | B2* | 1/2015 | Dorner | B65H 3/40 414/797 |
| 10,293,444 | B2* | 5/2019 | Takeda | B65G 47/1485 |
| 10,556,264 | B2* | 2/2020 | Hagel | B65G 47/901 |
| 10,632,581 | B2* | 4/2020 | Takeda | B25J 9/0018 |
| 2006/0099064 | A1 | 5/2006 | Yaron et al. | |
| 2015/0217359 | A1* | 8/2015 | Segura Golorons | B21D 43/22 414/790.9 |

FOREIGN PATENT DOCUMENTS

| | | | |
|---|---|---|---|
| EP | 2190604 A1 | 6/2010 | |
| JP | 2007237394 A | 9/2007 | |
| WO | 2009112051 A1 | 9/2009 | |
| WO | WO-2020187481 A1 * | 9/2020 | B21D 43/026 |
| WO | 2020009148 A1 | 7/2021 | |

* cited by examiner

APPARATUS FOR CENTERING AND LOADING FLAT FORMAT PARTS IN A PRESS

CROSS-REFERENCE TO RELATED APPLICATIONS

This application relates to and claims the benefit and priority to International Application No. PCT/EP2023/061874, filed May 4, 2023, which claims the benefit and priority to each of European Application No. 22382451.7, filed May 10, 2022, Spanish Utility Model Application No. U202230783, filed May 10, 2022, and European Application No. 22382947.4, filed Oct. 7, 2022, each of which is incorporated herein by reference in its entirety.

TECHNICAL FIELD

The present invention relates to assemblies for centering and loading flat format parts in a press, particularly for centering and loading metal sheets in a cutting press.

BACKGROUND

Production lines having presses to shape flat format parts, such as metal sheets, are known. These parts are generally processed in sectors, such as in the automotive sector, for example, in which the metal sheets are shaped in the press to obtain parts of the vehicle body.

The flat format parts are obtained in a continuous process from a metal coil which is uncoiled, processed, and cut into flat format parts. The flat format parts are subsequently stacked for subsequent processing in the press. Therefore, for the parts to be subsequently processed in the press, they generally require being unstacked, washed, and in some cases greased.

The shape required for the parts is obtained by means of press strokes. The press comprises a first surface (lower die) on which the part is placed by means of a transfer device. This first surface cooperates with a second surface (upper die), and the part is pressed between both surfaces to obtain the required shape. It is, therefore, very important for the transfer device to precisely place the part in the press, because if the part is not placed precisely, the shape acquired after pressing may not be the required shape, and this forces disposing of the part.

The part must be arranged in a theoretical position before the transfer device grabs it and places it in the press; however, parts can lose their theoretical loading position in the press while being conveyed towards the press, or during cleaning and greasing operations, and this causes the transfer device not to precisely place the part in the press. To avoid this problem, correcting the position of the parts and taking them to their theoretical position, before loading them in the press, is known. In addition to performing precise correction so as not to have to dispose of the part after shaping, it is important for the correction to be made quickly so as to avoid a drop in the production line performance.

One alternative for correcting the position of the parts consists of using mechanical stops which force the part to acquire the theoretical position, which stops can be fixed, mobile, or a combination of both. The stops have the drawback that they may damage the parts during centering. Furthermore, when parts with different formats are processed in the line, the stops must be reoriented for each format. Furthermore, when parts having an irregular shape are processed or several parts are processed at the same time, a large quantity of stops is needed to ensure the positioning.

Another alternative which allows the position to be corrected without damaging the parts consists of determining the position of the part with an optical measuring device, for example, a camera, comparing the real position of the part with the theoretical position, and correcting the position of the part by means of a centering device before the transfer device grabs it and places it in the press.

For example, EP2190604A1 shows a device for orienting flat format parts subsequently loaded in a press where they are shaped. The device allows work to be done with two parts simultaneously, improving line cycle times. In the embodiment shown in FIGS. 3 and 4, the device comprises a conveyor to convey two parts in a forward movement direction towards the press, an optical measuring device to determine the real position of the two parts on the conveyor, two centering devices arranged on each side of the conveyor which grab the parts from the conveyor, correct their position, and place them back on the conveyor in the theoretical position. The parts with the corrected position are sent by the conveyor towards the press where they are loaded by means of a single transfer device. The centering and loading of parts in the press is thereby performed separately by means of different devices.

DE102017121557A1 shows another device for orienting flat format parts which processes two parts simultaneously, in a production line. The device comprises a conveyor to convey two parts towards a press, an optical measuring device to measure the position of the parts and a centering device correcting the position of one of the parts with respect to the other part, such that the position of one of the parts is modified while the position of the other one of the parts is not modified, the number of handling operations for centering the assembly of the two parts thereby being reduced. A single transfer device subsequently grabs the two parts from the conveyor and places them on the press for both parts to be shaped in the press at the same time.

SUMMARY

Disclosed are assemblies for centering and loading flat format parts in a press.

The invention relates to a device for centering and loading flat format parts in a press comprising a first conveyor to convey the parts in a forward movement direction towards the press and an optical measuring device to determine the real position of the parts on the first conveyor. The device further comprises at least two transfer devices to grab the parts from the first conveyor and place them directly on a first surface of the press which is facing a second surface of the press cooperating in use with the first surface to shape the parts. The assembly further comprises a control unit which is configured for receiving the real position of the parts determined by the optical measuring device, and for comparing the real position with a theoretical loading position of the parts in the press, for determining a deviation between both positions, and for commanding the transfer devices to correct the deviation and place the parts on the first surface of the press in the theoretical position.

In this way, each transfer device is in charge of performing the operations of centering and loading a respective part in the press, and therefore, two different devices for each operation are not needed, such that the floor space occupied by the production line is reduced. In prior art documents EP2190604A1 and DE102017121557A1, there is a centering device downstream of the optical measuring device to center the parts, and there is a loading device downstream of the centering device to load the parts in the press, and this centering device configuration increases line length.

Furthermore, by using at least two transfer devices instead of just one, in the press at least two parts can be loaded at the same time, which improves cutting line performance. Moreover, using at least two transfer devices allows the cutting line to be able to continue working when one of the transfer devices fails, which is not possible in cutting lines using a single device for loading parts in the press, as is the case of EP2190604A1 or DE102017121557A1. Likewise, if the part to be loaded in the press is a large sized part, the two transfer devices can cooperate in loading the part, preventing it from bending and no longer being flat.

These and other advantages and features will become apparent in view of the figures and of the detailed description.

DETAILED DESCRIPTION

Figure 1:
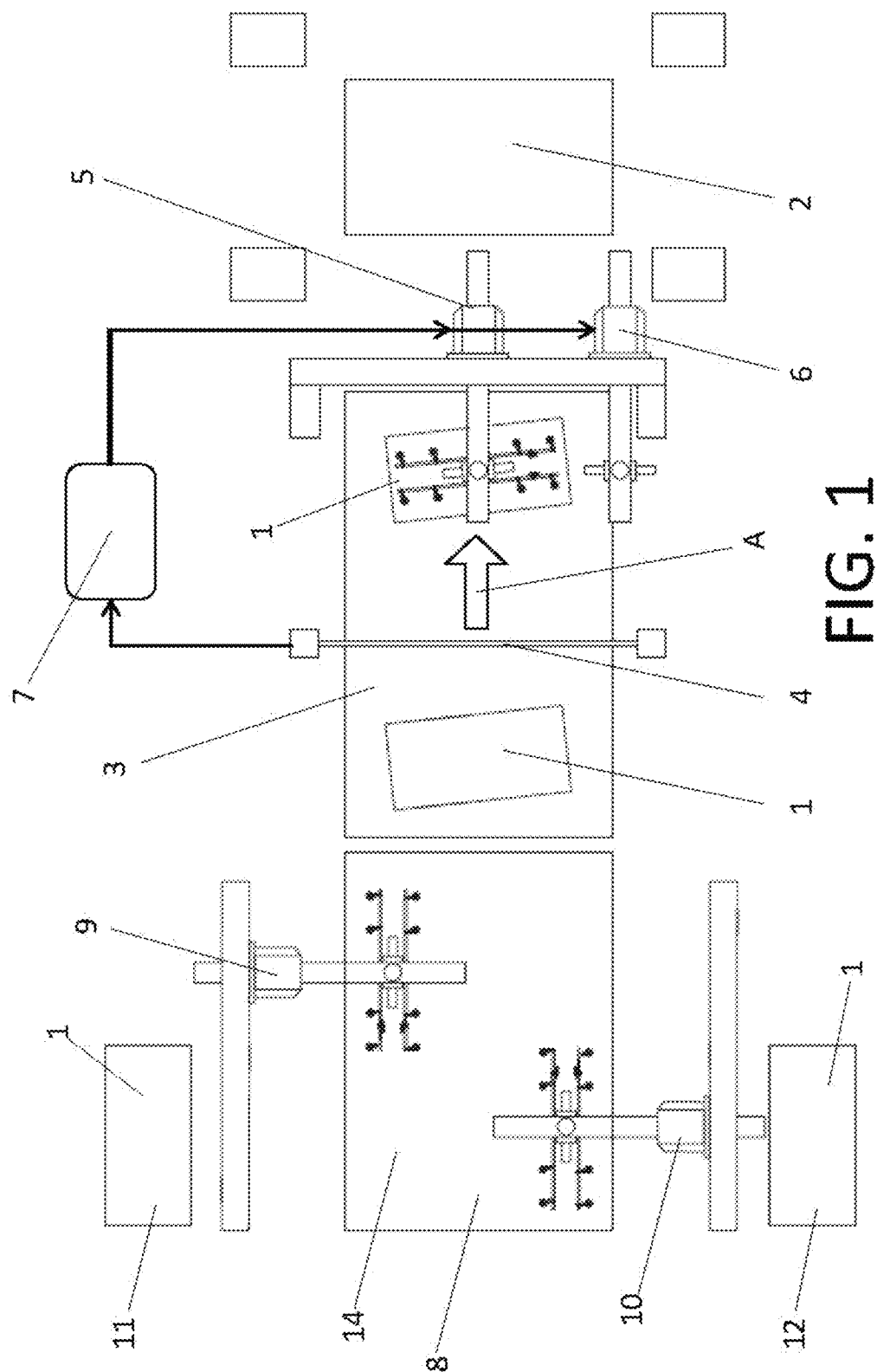
FIG. 1 shows a plan view of an example of a device for centering and loading flat format parts in a press.

FIG. 1 shows an example of a device for centering and loading flat format parts 1 in a press 2. The device is part of a production line in which flat format parts 1 are processed to shape final parts, for example, a line processing metal sheets 1 which are shaped in a press 2 to obtain parts of a vehicle body.

The device for centering and loading parts 1 in the press 2 comprises a first conveyor 3 to convey the parts 1 in a forward movement direction A towards the press 2 and an optical measuring device 4 to determine the real position of the flat format parts 1 on the first conveyor 3.

The first conveyor 3 may be a band conveyor belt as shown in the figures, or it may be a conveyor belt with multiple strips, pinch rolls, or other conveyor means conveying the parts 1 in the forward movement direction A towards the press 2.

The optical measuring device 4 may be located above the first conveyor 3, as shown in the examples of the figures. For example, the optical measuring device 4 may be a camera or a set of optical sensors arranged in a frame located above the first conveyor 3. Alternatively, the optical measuring device 4 may be located below the first conveyor 3. For example, the first conveyor 3 may have a groove and the optical measuring device 4 may be a camera or a set of optical sensors arranged below the groove of the first conveyor 3. Alternatively, the optical measuring device 4 may be located on one side of the first conveyor 3.

The optical measuring device 4 may determine the real position of the parts 1 while the parts 1 move forward on the conveyor 3 towards the press 2, or while the first conveyor 3 is stopped for a brief moment of time in which the operation of the first conveyor 3 is interrupted for the measuring device 4 to capture the position of the parts 1. The position of the parts 1 may be obtained from processing images of the parts 1 on the first conveyor 3 taken by a camera.

The device for centering and loading parts 1 in the press 2 further comprises at least two transfer devices 5 and 6 to grab the parts 1 from the first conveyor 3 and place them directly on a first surface 2a of the press 2 which is facing a second surface 2b of the press 2 cooperating in use with the first surface 2a to shape the parts 1. The first surface 2a of the press 2 corresponds with the lower die of the press 2, and the second surface 2b of the press 2 corresponds with the upper die of the press 2.

The device for centering and loading parts 1 in the press 2 also comprises a control unit 7 which is configured for receiving the real position of the parts 1 determined by the optical measuring device 4 and for comparing it with a theoretical loading position of the parts 1 in the press 2, for determining a deviation between both positions, and for commanding the transfer devices 5 and 6 to correct the deviation and place the parts 1 on the first surface of the press 2 in the theoretical position.

Specifically, the control unit 7 is configured for receiving an input signal indicative of the real position of the parts 1 on the conveyor 3 determined by the optical measuring device 4 and for comparing the real position with the theoretical loading position of the parts 1 in the press 2. The control unit is configured to determine the deviation between the real position of the parts and the theoretical loading position of the parts and to generate an output signal that is delivered to one or more motors of each of the transfer devices 5 and 6 to cause the transfer devices 5 and 6 to correct the deviation and place the parts 1 on the first surface of the press 2 in the theoretical position.

The control unit 7 may comprise a CNC (computerized numerical control machine) or a PLC (programable logic controller).

The press 2 may comprise a plurality of pressing stations to obtain final parts formed into the desired shape (as parts of a vehicle, for example). For example, a part may be arranged in a first station of the press for a pressing step, and once said step has ended, the part is conveyed to another station for the next pressing step. These steps are repeated as many times as there are steps required in one and the same press, until completing the entire process and obtaining the desired final part from the part as a result. To convey the parts from one station to another transfer devices such as devices 5 and 6 used to grab the parts 1 from the first conveyor 3 and load them in the first station of the press 2 may be used therein.

In the example shown in FIG. 1, one of the transfer devices 5 is operative for loading and centering a part 1 in the press 2, and the other transfer device 6 is not operative. This may be a case where one of the transfer devices has broken down, such that the line may continue working with the other transfer device, or even though there is no breakdown, due to operating simplicity and because the weight of the part so allows it, only one of the transfer devices works.

Figure 2A:
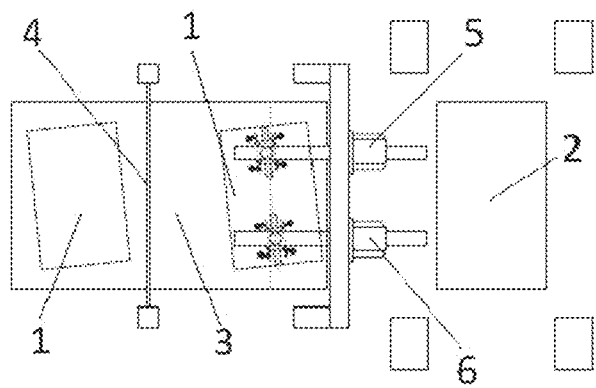
FIGS. 2A and 2B show two transfer devices grabbing a single part from the first conveyor and depositing it in the press.
Figure 2B:
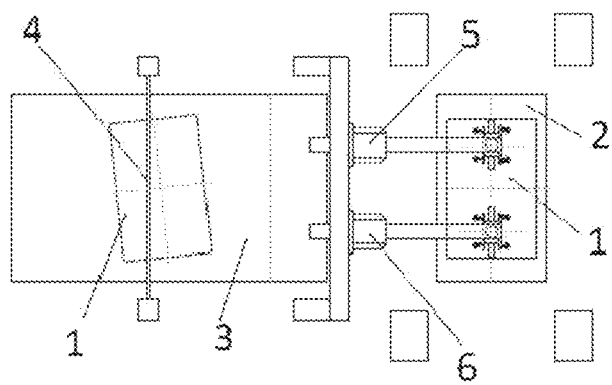

In another example shown in FIGS. 2A and 2B, the transfer devices 5 and 6 are configured for simultaneously grabbing a part 1 from the first conveyor 3 and place it on the first surface of the press 2 in the theoretical position. This configuration is suitable for centering and loading in the press 2 heavy parts or large sized parts 1, which cannot be handled precisely by a single transfer device, or which due to their size or weight require an improved transfer device for handling.

Figure 3A:
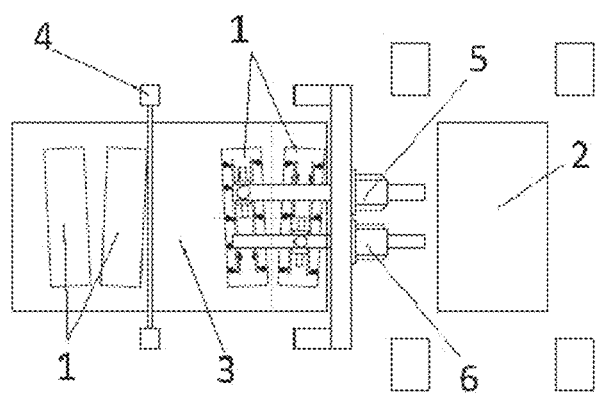
FIGS. 3A and 3B show two transfer devices grabbing a respective part from the first conveyor and depositing it in the press.
Figure 3B:
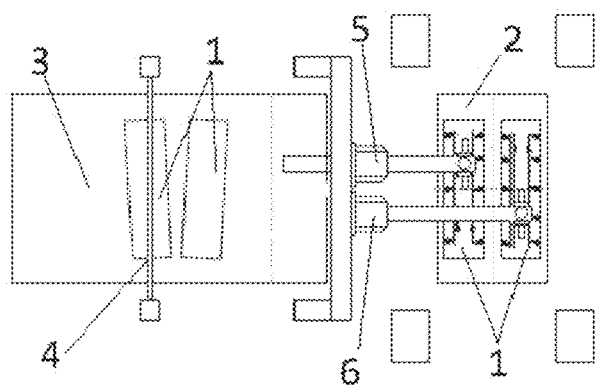

In another example shown in FIGS. 3A and 3B, one of the transfer devices 5 is configured for grabbing a first part 1 from the first conveyor 3 and place it on the first surface of the press 2 in its theoretical position and another one of the transfer devices 6 is configured for grabbing a second part 1 from the first conveyor 3 and place it on the first surface of the press 2 in its theoretical position, with being both parts 1 placed in the press 2 simultaneously. Simultaneously is understood to mean that the parts 1 are placed in the press 2 so that both parts are processed at the same time in the press; however, depending on the deviation of the parts there may be a slight offset between the correction of the position and the loading of one part with respect to the other part, since one part may be deviated from its theoretical loading position in the press more so than the other part.

Figure 4A:
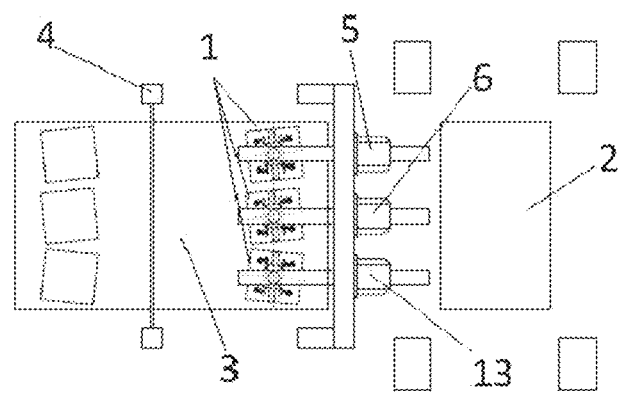
FIGS. 4A and 4B show three transfer devices grabbing a respective part from the first conveyor and depositing it in the press.
Figure 4B:
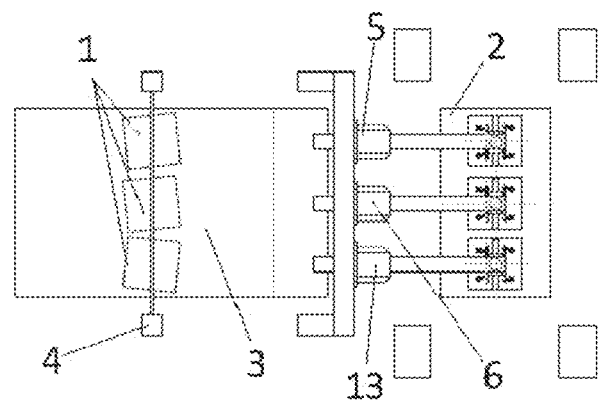

In another example shown in FIGS. 4A and 4B, the device for centering and loading flat format parts 1 in a press 2 further comprises another transfer device 13 which is configured for grabbing a third part 1 from the first conveyor 3 and place it on the first surface of the press 2 in its theoretical position, with the parts 1 being placed in the press 2 simultaneously. In this case, three parts 1 are processed simultaneously, and each one is centered and loaded in the press 2 by a respective transfer device. Therefore, the optical measuring device 4 determines the real position of each of the three parts 1 on the first conveyor 3, and the control unit 7 receives the real position of the three parts, compares it with the theoretical loading position of each part 1, and for each part determines a deviation between both positions, to subsequently command the three transfer devices 5, 6 and 13 to correct the deviation of each part 1 and place the three parts 1 on the first surface of the press 2 in the theoretical loading position of each part 1.

The transfer devices 5, 6 and 13 are located downstream of the optical measuring device 4, between the first conveyor 3 and the press 2, and the transfer devices 5, 6 and 13 are arranged in parallel with respect to the forward movement direction A of the parts 1, such that the space occupied by the devices is optimized and line length reduced.

The device for centering and loading flat format parts 1 in a press 2 further comprises an unstacking area 8 upstream of the first conveyor 3 comprising a first unstacking device 9 and a second unstacking device 10 to unstack the parts 1. For the sake of simplicity, only the unstacking area 8 is depicted in the example of FIG. 1; however, any of the examples of FIGS. 2, 3 and 4 may have the unstacking area 8.

The unstacking area 8 has a second conveyor 14 to convey the unstacked parts 1 in the forward movement direction A towards the first conveyor 3 where the optical measuring device 4 is located. The conveyors 3 and 14 may be of the same type. The transfer of parts 1 between conveyors 3 and 14 may be done by arranging the conveyors 3 and 14 close to one another, as shown in FIG. 1; however, transfer devices may be used to grab the parts 1 from one conveyor 14 and put them on the other first conveyor 3.

The unstacking area 8 may have a single unstacking device; however, when two parts are processed at the same time, as shown in FIG. 3, for example, and therefore, when two transfer devices 5 and 6 are used for each part, the unstacking area 8 preferably has two unstacking devices 9 and 10, such that parts may be unstacked in the time required to be processed by the press 2.

Preferably, the unstacking area 8 has a first part stack 11 from which the first unstacking device 9 unstacks parts and a second part stack 12 from which the second unstacking device 10 unstacks parts, as observed in FIG. 1. Two parts may thereby be unstacked one at a time.

Alternatively, the unstacking area 8 has a single part stack 11 from which the first unstacking device 9 and the second unstacking device 10 unstack parts in an alternating manner. Therefore, while one device 9 is leaving a part on the second conveyor 14, the other device 10 may be grabbing a part from the stack 11.

Figure 5:
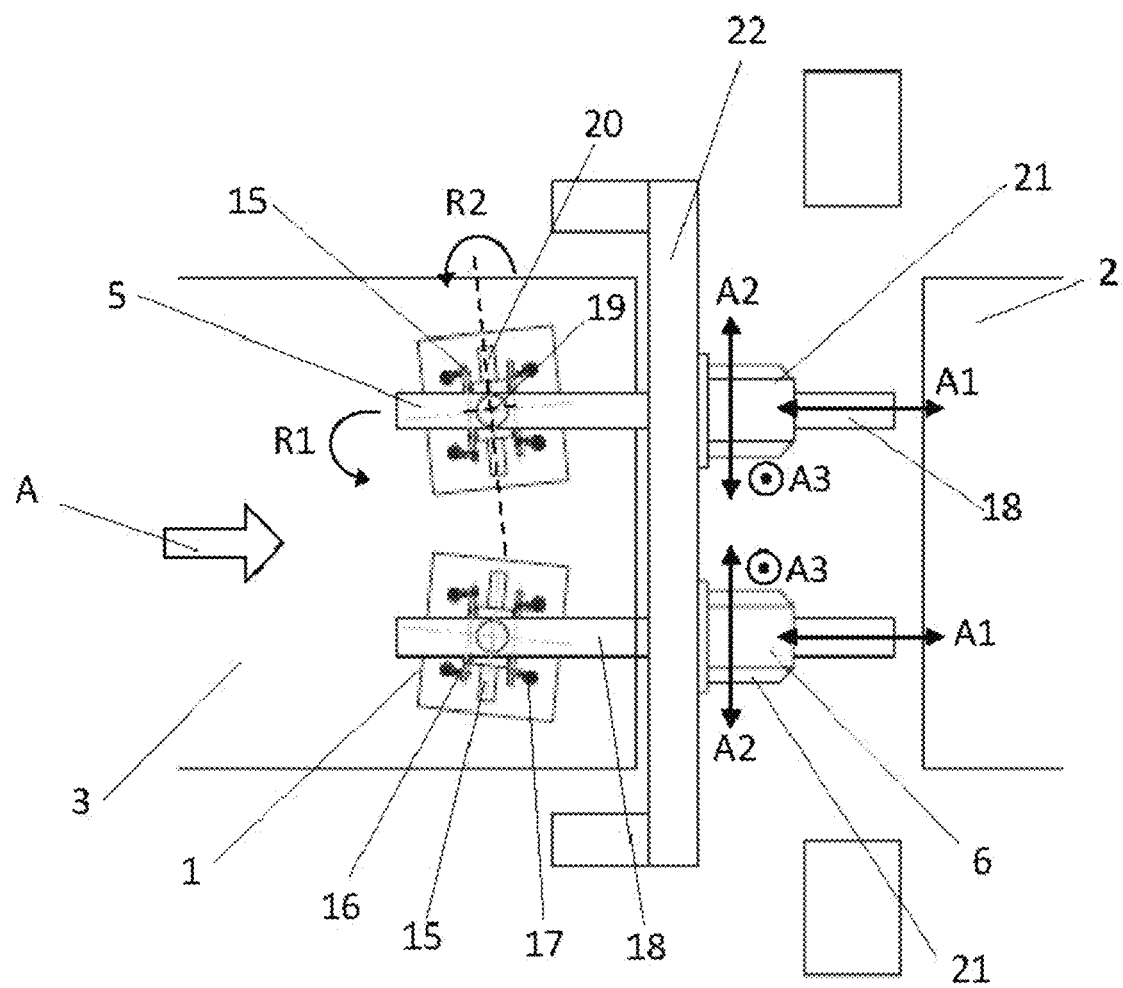
FIG. 5 shows an enlarged view of an example of one of the transfer devices, wherein the movement shafts of the device are shown.
Figure 6:
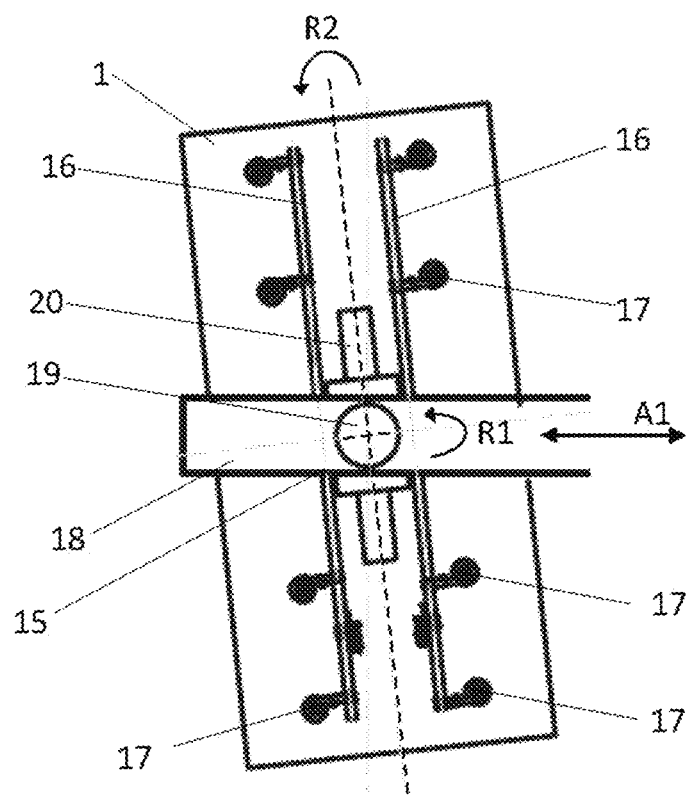
FIG. 6 shows an example of a flexible gripping device for gripping the parts from one of the transfer devices.

Each transfer device 5, 6 and 13 comprises a flexible gripping device 15 with supporting arms 16 having gripping elements 17 to grip the parts 1. Preferably, the gripping elements 17 comprise suction cups, however, they could be other gripping elements such as hooks or magnets. FIGS. 5 and 6 show the flexible gripping device 15 of the transfer devices in detail.

Preferably, the gripping elements 17 comprise vacuum suction cups. The vacuum of the suction cups may be applied jointly to all the suction cups, or the vacuum of each suction cup may be individually activated, such that gripping functions of the gripping device 15 become more flexible.

The gripping elements 17 may be integral to the supporting arm 16 or shiftable on the supporting arm 16. The shifting may be manual or automatic by means of a motor which shifts the gripping element 17 with respect to the supporting arm 17. For example, the supporting arm 16 may have a guide rail and each gripping element 17 may have a carriage which may shift along the guide rail of the supporting arm 16. The gripping elements 17 may have locking and unlocking positions to fix their position in the supporting arm 16. The shifting of the gripping elements 17 on the supporting arm 16 allows the grip to be adapted based on the characteristics of the part. Moreover, the length of the supporting arms 16 may be selected based on the size of the part 1 to be gripped.

The flexible gripping device 15 may be coupled to a robot, for example, to an anthropomorphic robot with 6 degrees of freedom. However, the design of the shafts illustrated in FIGS. 5 and 6 is particularly suitable for a single transfer device to be able to jointly perform the centering and the loading of a respective part 1 in the press 2 in the time required for feeding the press 2.

The flexible gripping device 15 is coupled to a crosspiece 18 which is shiftable according to a first movement A1 parallel to the forward movement direction A and a second movement A2 perpendicular to the forward movement direction A, and the flexible gripping device 15 is shiftable according to a third vertical movement A3 with respect to the first conveyor 3.

Moreover, the flexible gripping device 15 is rotatable with respect to the crosspiece 18 according to a first rotational movement R1 about a first shaft 19 which is perpendicular to the first conveyor 3. This rotational movement R1 is particularly suitable to correct the real position of the part 1 and to enable taking it to the theoretical loading position in the press 2.

Additionally, the flexible gripping device 15 may also tilt with respect to the crosspiece 18 according to a second rotational movement R2 about a second shaft 20 which is parallel to the first conveyor 3. This movement allows the parts 1 to be arranged in a tilted position on the press 2. It further allows the parts 1 to be tilted during loading to prevent interferences between the transfer devices or with other parts of the line.

Preferably, the control unit 7 is configured to generate output signals that are delivered to a first motor, a second motor, a third motor, a fourth motor, and additionally to a fifth motor, of each of the transfer devices 5 and 6, to cause the transfer devices 5 and 6 to correct the deviation of the parts 1 and place the parts 1 on the first surface of the press 2 in the theoretical position.

Preferably, the first motor causes the first movement A1 parallel to the forward movement direction A, the second motor causes second movement A2 perpendicular to the forward movement direction A, the third motor causes the third vertical movement A3, the fourth motor causes the first rotational movement R1, and the fifth motor causes the second rotational movement R2.

The flexible gripping device 15 is shiftable according to the third vertical movement A3 so as that the gripping elements 17 may be raised and lowered and so that the parts 1 may be gripped from the first conveyor 3 and loaded in the press 2. For example, the crosspiece 18 may be shiftable with respect to the first conveyor 3, or the flexible gripping device 15 may be shiftable vertically with respect to the crosspiece 18. For example, the second shaft 20 may be vertically shifted on the first shaft 19 in order to raise or lower the supporting arms 16 with the gripping elements 17.

The flexible gripping device 15 thereby has three linear shifting movements A1, A2, and A3 on three main shafts, forming right angles with one another, a rotational movement R1 and a tilting movement R2.

Preferably, each transfer device 5, 6 and 13 has a transfer carriage 21 which is shiftable on a beam 22 according to the second movement A2 perpendicular to the forward movement direction A, and the crosspiece 18 of each transfer device 5, 6 and 13 is shiftable on the transfer carriage 21 according to the first movement A1 parallel to the forward movement direction A.

The transfer carriage 21 may be shiftable with respect to the beam 22 according to the third vertical movement A3 so that the gripping elements 17 may be raised and lowered and so that the parts 1 can be grabbed from the first conveyor 3 and loaded in the press 2.

Preferably, the first motor, second motor and third motor, that respectively cause the first movement A1, second movement A2 and third vertical movement A3, are located on the transfer carriage 21.

More preferably, the fourth motor and fifth motor, that respectively cause the first rotational movement R1 and second rotational movement R2, are located on the flexible gripping device 15.

The beam 22 may be part of a frame which is arranged above the first conveyor 3.

The beam 22 may be shiftable with respect to the frame according to the third vertical movement A3 so that the gripping elements 17 may be raised and lowered and so that the parts 1 may be grabbed from the first conveyor 3 and loaded in the press 2.

Preferably, as shown in the figures, the transfer carriages 21 of the transfer devices 5, 6 and 13 are shiftable on a single beam 22. The transfer devices 5, 6 and 13 are therefore parallel to one another, and the occupied floor space is optimized.

Figure 7:
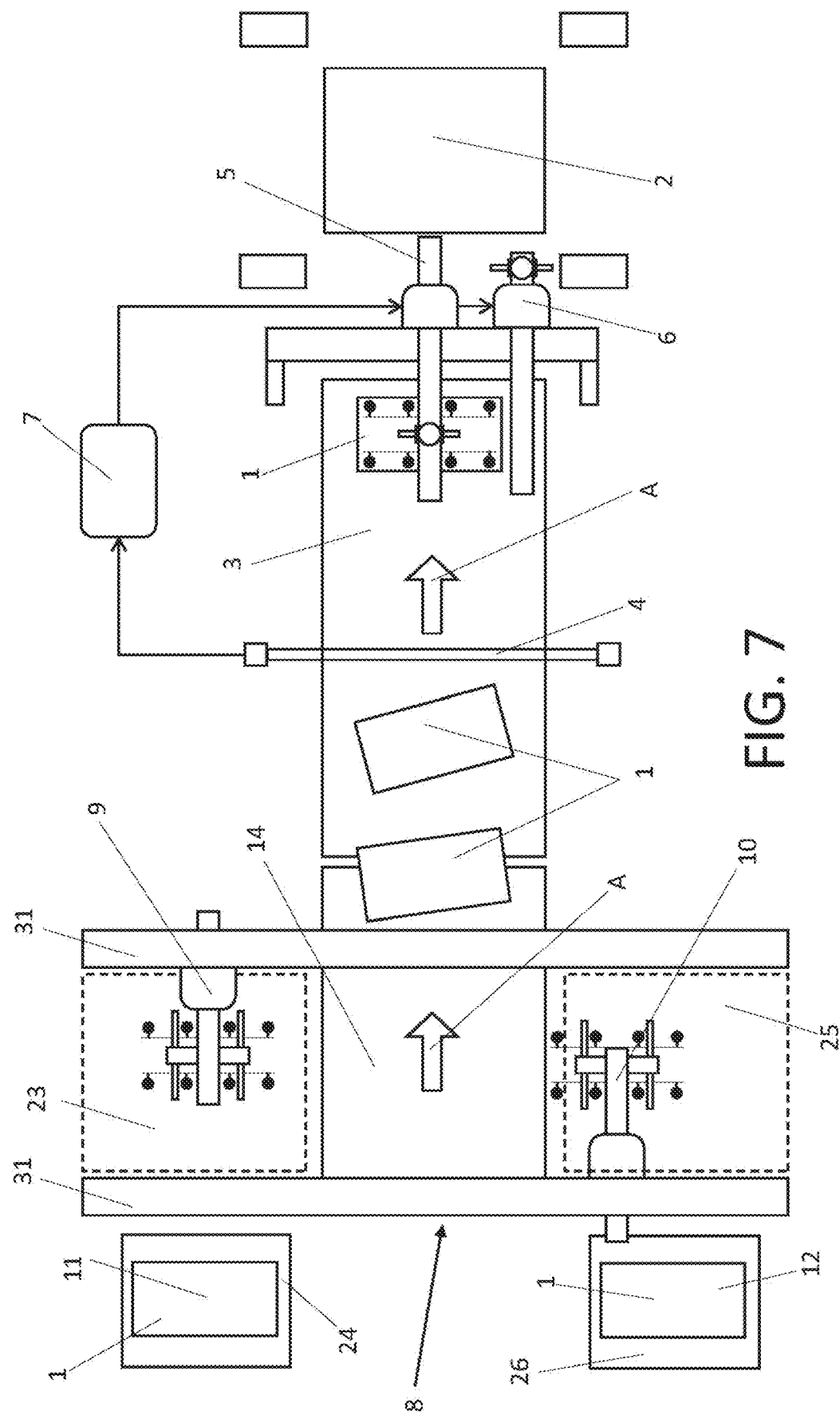
FIG. 7 shows a plan view of another embodiment of the production line according to another embodiment

FIG. 7 shows another embodiment of a device for centering and loading flat format parts 1 in a press 2. FIG. 7 shows an unstacking area 8 different from that of FIG. 1. The rest of the elements in FIG. 7, this is the first conveyor 3, the optical measuring device 4, the transfer devices 5 and 6, and the control unit 7 are as the ones described above. In other words, the unstacking area of FIG. 7 can be associated with any of the elements described in FIGS. 1 to 6.

The unstacking area 8 of this other embodiment of FIG. 7 is also arranged upstream of the first conveyor 3 and comprises a first unstacking device 9 and a second unstacking device 10 for unstacking parts 1. Using two transfer devices 5 and 6 with two unstacking devices 9 and 10 allows to obtain a high cadence in the press 2.

The unstacking area 8 also comprises a second conveyor 14 which is aligned with the first conveyor 3 for transporting the unstacked parts 1 in the forward movement direction A towards the first conveyor 3, a first part collecting area 23 arranged at one side of the second conveyor 14 having a first table 24 with a first stack of parts 11 and a second part collecting area 25 arranged at the other side of the second conveyor 14 having a second table 26 with a second stack of parts 12.

The unstacking devices 9 and 10 are configured to transport the parts 1 from the part collecting areas 23 or 25 to the second conveyor 14 with the parts 1 located in the same horizontal plane, the unstacking devices 9 and 10 being movable outside of the part collecting area 23 or 25 so as not to interfere with part 1 being transported from the part collecting area 23 or 25 to the second conveyor 14. By "same horizontal plane" it is meant that parts 1 are transported at the same height, which essentially corresponds to the height of the second conveyor 14 on which the parts 1 are deposited.

That is to say, the first and second unstacking devices 9 and 10 take parts 1 alternately from the same part collecting area 23 or 25 to transfer and deposit them on the second conveyor 14, and while one of the unstacking devices is picking up a part 1 to take it to the second conveyor 14, the other unstacking device 9 or 10 is outside the part collecting area 23 or 25 so as not to interfere. To avoid interference between the devices 9 and 10, the parts 1 could be moved at different heights, however, the greater the overhang of the unstacking device 9 or 10, the greater the vibrations generated in the parts 1, which is counterproductive when large sized parts are transported (such as flat formats of 4300 mm×2100 mm). Conveying the parts 1 at the same height without the stacking devices 9 and 10 having to vary the height at which the parts 1 are transported makes it possible to obtain unstacking devices 9 and 10 that are more rigid.

Figure 8:
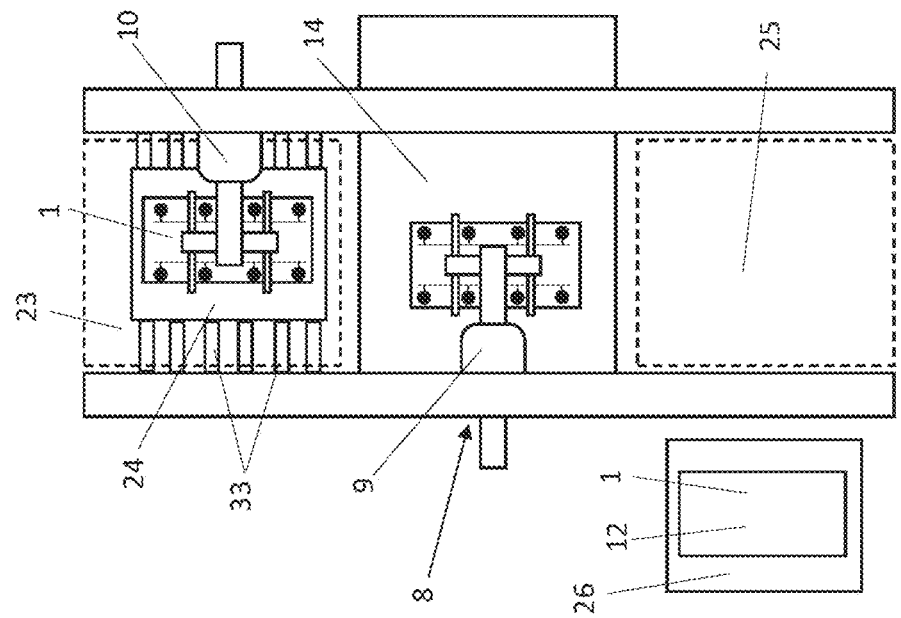
FIG. 8 shows the unstacking area of the production line of FIG. 7, with one of the unstacking devices outside the area for collecting parts so as not to interfere with the other unstacking device that is picking up a part.
Figure 9:
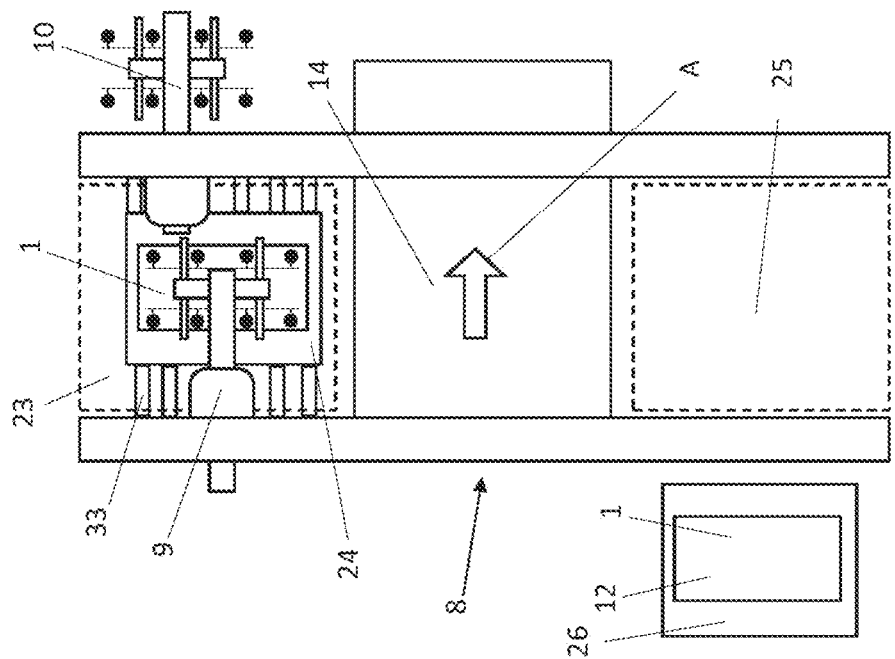
FIG. 9 shows the unstacking area of the production line of FIG. 7, with one of the unstacking devices leaving a piece and the other unstacking device taking a piece from the collection area.
Figure 11:
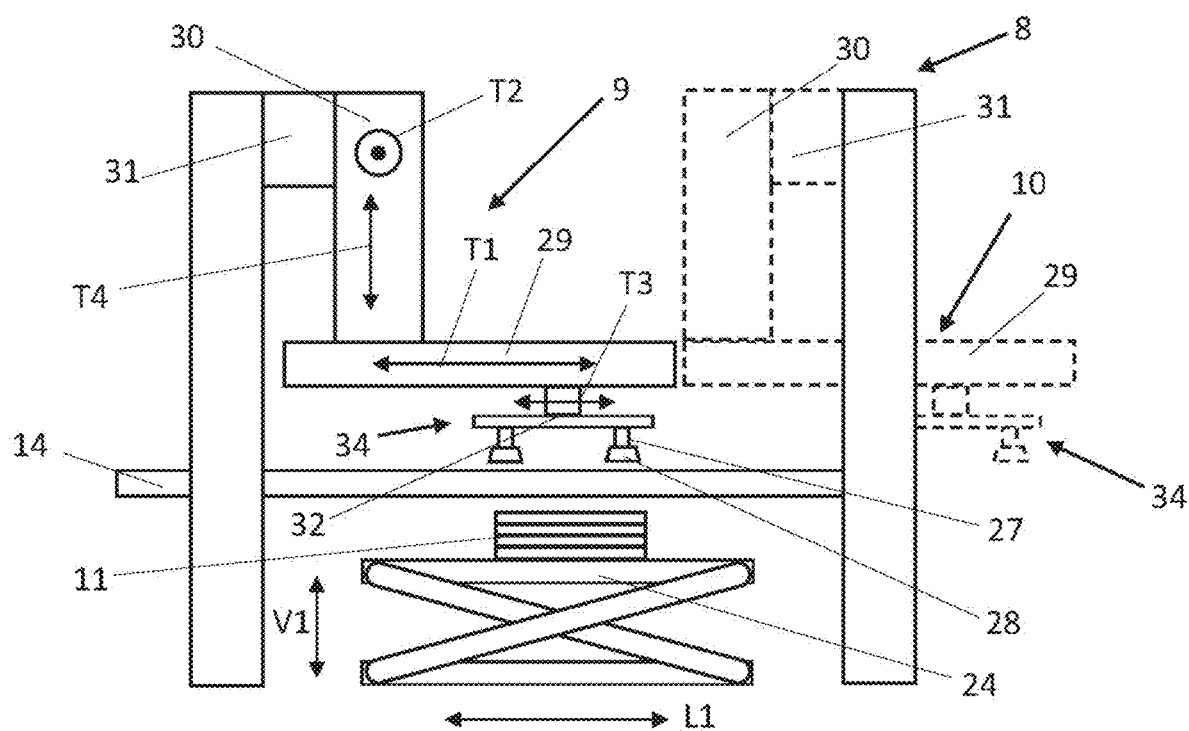
FIG. 11 shows a side view of the unstacking area of the production line of FIG. 7.
Figure 12:
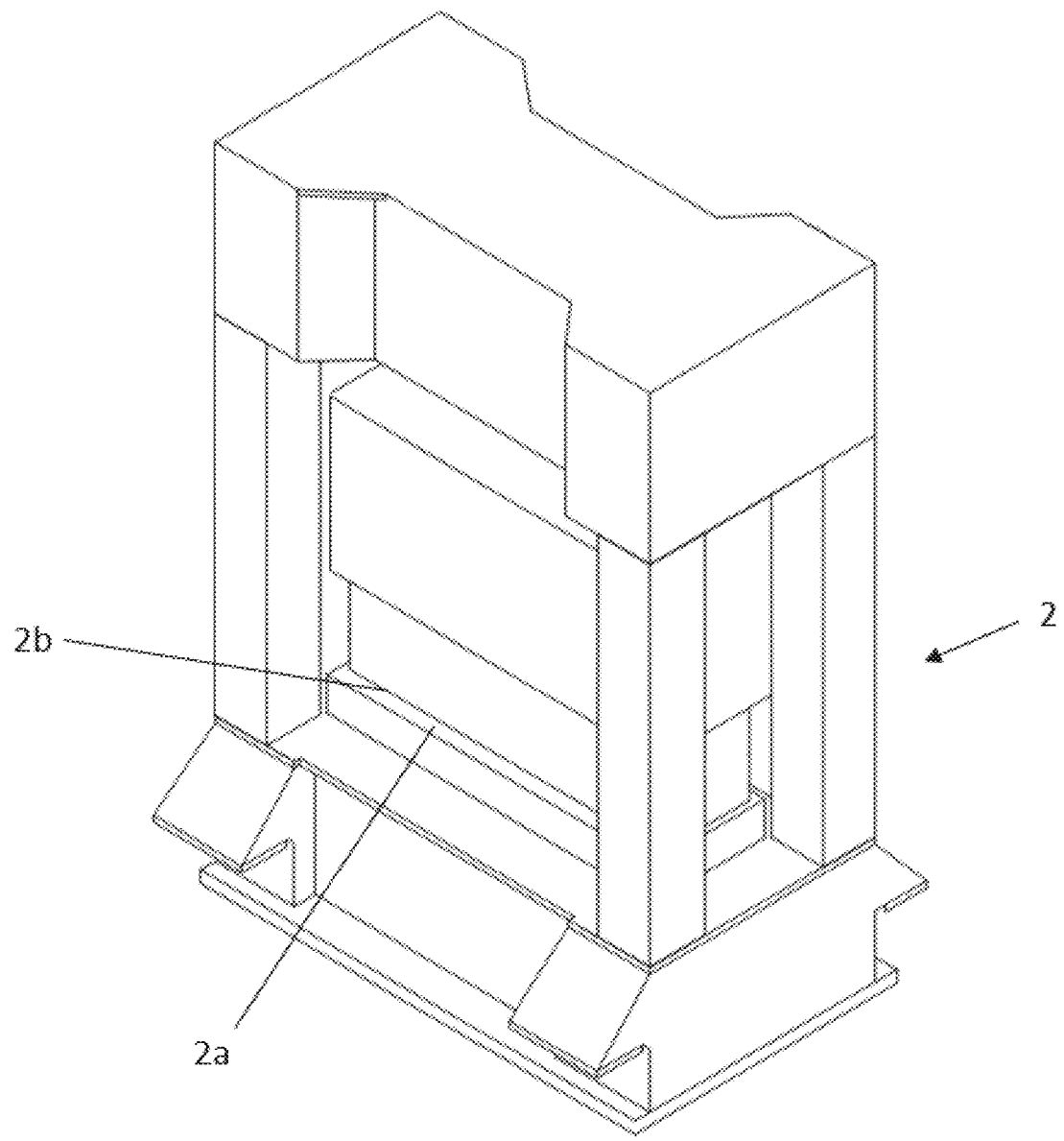
FIG. 12 illustrates a press having first and second surfaces that face one another.

As seen in detail in FIGS. 8, 9 and 11, each table 24 and 26 is movable from a reloading position, where the table 24 or 26 is arranged outside the part collecting area 23 or 25, to a position collection, where the table 24 or 26 is arranged in the part collecting area 23 or 25, so that the parts 1 are collected by the unstacking devices 9 and 10.

The line has two tables 24 and 26 and two part collecting areas 23 and 25 so that while the unstacking devices 9 and 10 are picking up parts 1 from the first table 24, an operator is reloading parts 1 from the second table 26. Thus, when the unstacking devices 9 and 10 have finished picking up the parts 1 from the first table 24, they move from the first area 23 to the second area 25 to start picking up the parts 1 from the second table 26, while an operator reloads the first table 24. This ensures a continuous supply of parts 1 to the press 2.

FIGS. 8 and 9 show the first table 24 arranged in the first part collecting area 23 with unstacking devices 9 and 10 unstacking parts 1 from said first table 24, while the second table 26 is outside the second part collecting area 25 to be reloaded with new parts 1. FIG. 8 also shows the first unstacking device 9 arranged in the first part collecting area 23 and the second unstacking device 10 arranged outside the first part collecting area 23 so as not to interfere with the first unstacking device 10. FIG. 9 shows how the first unstacking device 9 has moved from the first part collecting area 23 to the second conveyor 14 to deposit a part 1, while the second unstacking device 10 has moved to the first part collecting area 23 to pick up a new part 1 and take it to the second conveyor 14.

Figure 10:
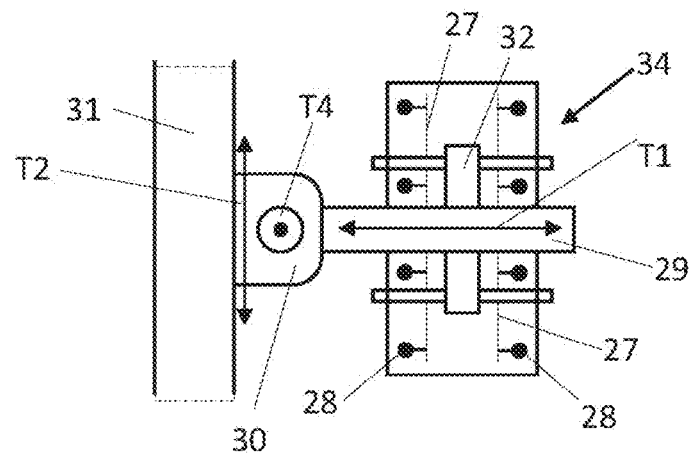
FIG. 10 shows a plan view of an example of a flexible gripping device to grip the parts of one of the unstacking devices of the production line of FIG. 7.

As seen in detail in FIGS. 10 and 11, each unstacking device 9 and 10 comprises a flexible gripping device 34 with support arms 27 having grippers 28 for gripping the parts 1. The flexible gripping device 34 is coupled to a crossbar 29 that is movable according to a first translational movement T1 parallel to the forward movement direction A in order to displace the unstacking device 9 or 10 out of the part collecting area 23 or 25, and the crossbar 29 is connected to a translation carriage 30 that is movable on a beam 31 according to a second translation movement T2 perpendicular to the forward movement direction A.

Each unstacking device 9 and 10 is movable on a respective beam 31. As shown in FIGS. 7, 8, 9 and 11, the unstacking area 8 has two beams 31 parallel to each other and perpendicular to the forward movement direction A of the parts 1. Alternatively the two unstacking devices 9 and 10 can move on the same beam 31, in which case each unstacking device 9 and 10 moves on one side of the beam 31, requiring in such a case more beam width.

The first translation movement T1 can be used to move the crossbar 29 with the flexible gripping device 34 into and out of the part collecting area, while the second translation movement T2 can be used to move the translation carriage 31 with the crossbar 29 and the flexible gripping device 34 can be moved towards the second conveyor 14 and can also be moved between the part collecting areas 23 and 25.

Additionally, the flexible gripping device 34 is arranged on a further translation carriage 32, which is displaceable relative to the crossbar 29 by a third translation movement T3 parallel to the forward movement direction A. In this way, the transverse position of the flexible gripping device 34 on the parts 1 that are in the parts collecting area can be adjusted. The parts collecting areas 23 and 25 may have stops 33 to align the parts 1 on their respective table 24 or 26 before the unstacking device 9 or 10 picks up them. Said stops 33 can be static mechanical stops or they can be manually or automatically movable mechanical stops. See FIGS. 8 and 9.

As shown in FIG. 11, the first table 24 is movable by a linear displacement L1 parallel to the forward movement direction A to enter and exit the first part collecting area 23 and is also movable by a vertical displacement V1 to approximate the parts 1 towards the gripping elements 28 of the flexible gripping device 34. For example, the table 24 may have a scissor mechanism to lift the parts 1. The second table 26 can be identical to the first table 24.

Additionally, the stacking devices 9 and 10 are movable according to a fourth translation movement T4 in the vertical direction to bring the parts 1 closer to the gripping elements 28, which is complemented by the vertical displacement on the table. For example, the carriage 30 can be moved vertically with respect to the beam 31.

As in the transfer devices 4, 5 and 6, the gripping elements 28 of the unstacking devices 9 and 10 can be integral with the support arm 27, or they can be movable on the support arm 27. The displacement can be manual, or automatic by means of a motor that moves the grip element 28 with respect to the support arm 27. For example, the support arm 27 can have a guide rail and each grip element 28 can have a carriage that moves along the guide rail of the support arm 27. The grip elements 28 can have locking and unlocking positions to fix their position on the support arm 27. The displacement of the grip elements 28 on the support arm 27 allows adapting the grip depending on the characteristics of the part 1. On the other hand, the length and the number of the support arms 27 can be selected depending on the size of the part 1 that is required to be gripped. The position of the support arms 27 can also be adjusted with respect to the carriage 32 in the same way that the grip elements 28 can be adjusted with respect to the support arm 27. Preferably, the grip elements 28 comprise some suction cups, however, other gripping elements are also possible instead, such as claws or magnets. Even more preferably, the gripping elements 28 comprise vacuum cups. The vacuum can be applied to all cups together, or the vacuum for each cup can be activated individually.

What is claimed is:

1. An apparatus for loading flat format parts of a first shape in a press, the apparatus comprising:
the press, the press including a first surface onto which each of the flat format parts is to be placed in a theoretical loading position, the press further including a second surface facing the first surface, the first and second surfaces are configured to repeatably cooperate with one another to act on the flat format parts to create parts having a second shape that is different than the first shape;
a first conveyor located upstream the press and configured to carry the flat format parts in a forward movement direction towards the press;
an optical measuring device that is configured to determine a real position of each of the flat format parts on the first conveyor;
a first transfer device and a second transfer device that is each configured to respectively grab a first flat format part residing in a first real position on the first conveyor and a second flat format part residing in a second real position on the first conveyor; and
a control unit configured to receive output signals from the optical measuring device that are indicative of the first and second real positions, the control unit configured to determine a first deviation between the first real position and the theoretical loading position of the first flat format part and to determine a second deviation between the second real position and the theoretical loading position of the second flat format part, the control unit is configured to use the calculated first deviation to command the first transfer device to alter the position of the first flat format part to correct the first deviation and to place the first flat format part on the first surface of the press in the theoretical loading position of the first format part after altering the position of the first flat format part, the control unit is configured to use the calculated second deviation to command the second transfer device to alter the position of the second flat format part to correct the second deviation and to place the second flat format part on the first surface of the press in the theoretical loading position of the second format part after altering the position of the second flat format part, each of the first and second transfer devices including a flexible gripping device with supporting arms having gripping elements coupled thereto, the flexible gripping device being coupled to a crosspiece which is shiftable according to a first movement (A1) parallel to the forward movement direction and a second movement (A2) perpendicular to the forward movement direction (A), the flexible gripping device being shiftable according to a third vertical movement (A3) with respect to the first conveyor, the flexible gripping device being rotatable with respect to the crosspiece according to first a rotational movement (R1) about a first shaft that is arranged perpendicular to the forward movement direction.

2. The apparatus according to claim 1, wherein the control unit is configured to cause the first and second transfer devices to respectively place the first and second flat format part on the first surface of the press simultaneously.

3. The apparatus according to claim 1, further comprising an unstacking area located upstream of the first conveyor, located in the unstacking area are first and second unstacking devices that is each configured to unstack the flat formats parts arranged in a single stack in the unstacking area.

4. The apparatus according to claim 3, wherein the first unstacking device and the second unstacking device are configured to unstack the flat format parts in the single stack in an alternating manner.

5. The apparatus according to claim 1, wherein the first and second transfer devices are located between the first conveyor and the press and are arranged in parallel with one another with respect to the forward movement direction.

6. The apparatus according to claim 1, wherein the flexible gripping device is tiltable with respect to the crosspiece according to a second rotational movement (R2) about a second shaft which is arranged parallel to the forward movement direction.

7. The apparatus according to claim 1, wherein each of the first and second transfer devices includes a transfer carriage that is shiftable on a beam according to the second movement (A2) perpendicular to the forward movement direction (A), and the crosspiece of each of the first and second transfer devices is shiftable on the transfer carriage according to the first movement (A1).

8. The apparatus according to claim 1, wherein each of the first and second transfer devices includes a transfer carriage that is shiftable on a single beam according to the second movement (A2) perpendicular to the forward movement direction (A), and the crosspiece of each of the first and second transfer devices is shiftable on the transfer carriage according to the first movement (A1).

9. The apparatus according to claim 1, wherein each of the first and second transfer devices includes a flexible gripping device with a plurality of support arms, each of the plurality of support arm including one or more gripping elements.

10. The apparatus according to claim 1, wherein the theoretical loading position of the first flat format part and the theoretical loading position of the second flat format part are the same.

11. An apparatus for loading flat format parts of a first shape in a press, the apparatus comprising:

the press, the press including a first surface onto which each of the flat format parts is to be placed in a theoretical loading position, the press further including a second surface facing the first surface, the first and second surfaces are configured to repeatably cooperate with one another to act on the flat format parts to create parts having a second shape that is different than the first shape;

a first conveyor located upstream the press and configured to carry the flat format parts in a forward movement direction towards the press;

an optical measuring device that is configured to determine a real position of each of the flat format parts on the first conveyor;

a first transfer device and a second transfer device that is each configured to respectively grab a first flat format part residing in a first real position on the first conveyor and a second flat format part residing in a second real position on the first conveyor;

a control unit configured to receive output signals from the optical measuring device that are indicative of the first and second real positions, the control unit configured to determine a first deviation between the first real position and the theoretical loading position of the first flat format part and to determine a second deviation between the second real position and the theoretical loading position of the second flat format part, the control unit is configured to use the calculated first deviation to command the first transfer device to alter the position of the first flat format part to correct the first deviation and to place the first flat format part on the first surface of the press in the theoretical loading position of the first format part after altering the position of the first flat format part, the control unit is configured to use the calculated second deviation to command the second transfer device to alter the position of the second flat format part to correct the second deviation and to place the second flat format part on the first surface of the press in the theoretical loading position of the second format part after altering the position of the second flat format part; and an unstacking area located upstream of the first conveyor, located in the unstacking area are first and second unstacking devices that is each configured to unstack the flat format parts arranged in one or more stacks in the unstacking area, each of the first and second unstacking devices includes a flexible gripping device with support arms having gripping elements coupled thereto, the flexible gripping device being coupled to a crossbar that is movable according to a first translational movement (T1) parallel to the forward movement direction (A) to respectively move the first and second unstacking devices outside the first and second part collecting areas, the crossbar being attached to a translation carriage that is movable on a beam according to a second translation movement (T2) perpendicular to the forward movement direction (A).

12. The apparatus according to claim 11, wherein the one or more stacks include a first part stack from which the first unstacking device unstacks the flat format parts and a second part stack from which the second unstacking device unstacks the flat format parts.

13. The apparatus according to claim 11, further comprising a second conveyor located in the unstacking area, the second conveyor being aligned with the first conveyor and being configured to transport the unstacked flat format parts in the forward movement direction towards the first conveyor, the unstacking area further including a first part collecting area arranged on a first side of the second conveyor and a second part collecting area on a second side of the second conveyor, the second side being opposite the first side, the first and second unstacking devices being respectively located in the first and second part collecting area with the first unstacking device being configured to transport unstacked flat format parts to the second conveyor.

14. The apparatus according to claim 13, wherein the first and second unstacking devices are configured to transport the unstacked flat format parts to the second conveyor in a same horizontal plane, with the first and second unstacking devices being respectively movable outside the first and second part collecting areas.

15. An apparatus for loading flat format parts of a first shape in a press, the apparatus comprising:
the press, the press including a first surface onto which each of the flat format parts is to be placed in a theoretical loading position, the press further including a second surface facing the first surface, the first and second surfaces are configured to repeatably cooperate with one another to act on the flat format parts to create parts having a second shape that is different than the first shape;
a first conveyor located upstream the press and configured to carry the flat format parts in a forward movement direction towards the press;
an optical measuring device that is configured to determine a real position of each of the flat format parts on the first conveyor;
a first transfer device and a second transfer device that is each configured to respectively grab a first flat format part residing in a first real position on the first conveyor and a second flat format part residing in a second real position on the first conveyor;
a control unit configured to receive output signals from the optical measuring device that are indicative of the first and second real positions, the control unit configured to determine a first deviation between the first real position and the theoretical loading position of the first flat format part and to determine a second deviation between the second real position and the theoretical loading position of the second flat format part, the control unit is configured to use the calculated first deviation to command the first transfer device to alter the position of the first flat format part to correct the first deviation and to place the first flat format part on the first surface of the press in the theoretical loading position of the first format part after altering the position of the first flat format part, the control unit is configured to use the calculated second deviation to command the second transfer device to alter the position of the second flat format part to correct the second deviation and to place the second flat format part on the first surface of the press in the theoretical loading position of the second format part after altering the position of the second flat format part; and
a third transfer device that is configured to grab a third flat format part residing in a third real position on the first conveyor, the control unit configured to receive an output signal from the optical measuring device that is indicative of the third real position and to determine a third deviation between the third real position and the theoretical loading position of the third flat format part, the control unit configured to use the calculated third deviation to command the third transfer device to alter the position of the third flat format part to correct the third deviation and to place the third flat format part on the first surface of the press in the theoretical loading position of the third flat format part after altering the position of the third flat format part.

16. The apparatus according to claim 15, wherein the control unit is configured to cause the first, second and third transfer devices to respectively place the first, second and third flat format part on the first surface of the press simultaneously.

17. The apparatus according to claim 15, wherein the first, second and third transfer devices are each located between the first conveyor and the press and are arranged parallel with one another with respect to the forward movement direction.

18. The apparatus according to claim 15, wherein the theoretical loading position of the first flat format part, the theoretical loading position of the second flat format part and the theoretical loading position of the third flat format part are the same.

* * * * *